UNITED STATES PATENT OFFICE.

W. HARROLD SMITH, OF PHILADELPHIA, PENNSYLVANIA.

IMPROVEMENT IN METHODS OF PREPARING SLAG FOR USE IN THE MANUFACTURE OF ARTIFICIAL STONE.

Specification forming part of Letters Patent No. 155,990, dated October 13, 1874; application filed October 5, 1874.

*To all whom it may concern:*

Be it known that I, W. HARROLD SMITH, of Philadelphia, in the county of Philadelphia and State of Pennsylvania, have invented certain new and useful Improvements in the Utilization of Furnace-Slag; and I do hereby declare the following to be a full, clear, and exact description of the invention, such as will enable others skilled in the art to which it pertains to make and use it, reference being had to the accompanying drawings, which form part of this specification.

My invention has for its object to utilize furnace slag or cinder for the various purposes hereinafter enumerated. My invention accordingly consists in, first, the process of refining and preparing blast-furnace slag for use by successively granulating, screening, admixing with cement or lime, pulverizing, and again screening the same; and, secondly, the process of preparing blast-furnace slag for use by successively granulating, admixing with cement or lime, and pulverizing.

To carry my invention into effect the molten slag or cinder as it comes from the mouth of the blast-furnace is dropped into or run through water, by which it is crystallized. While in the water it is subjected to the action of screws or wheels, by which it is broken. It is then removed from the water, and either, while still moist or after being dried, may be subjected to the next process, which consists in crushing and grinding or pulverizing it to any required degree of fineness. Before crushing and grinding or pulverizing it, however, it should be passed through sieves, in order to remove any large unbroken pieces of slag, or any lumps of metal, that would force apart or injure the grinding-rollers. While, or before, passing through the grinding rolls or cylinders, the slag may be combined with cement, and the slag and cement or lime thus combined will harden, forming a firm and solid material, which may be adapted to the various uses hereinafter enumerated.

The following proportions may be advantageously employed for forming a solid material: Two parts of slag to two of cement; three parts of slag to one of cement; one part of slag to three of cement, combined with water in proportions of three of the mixture to one of water, and in some cases the water may be wholly dispensed with. In adapting the compound to the various uses to which it is applicable, it must be manipulated according to the character of each. Thus, where it is formed into bricks, slabs, blocks, statuary, &c., molds should be employed to give the requisite forms; for road-beds, coating water-reservoirs, &c., it may be laid *en masse;* while for application to walls, posts, piers, &c., different but suitable means must be brought into requisition. In cases where blocks or equivalents are formed, the material or mixture will be subjected to hydraulic or other pressure, the greater the better, and where merely laid *en masse* it should be rolled or pounded.

In some cases I combine with this ground or pulverized granulated slag, or combine with the granulated slag unground asphalt, or asphaltic or bituminous compounds, and use the composition for the various purposes hereinafter enumerated. The proportions employed for this composition are as follows: Say, one part of asphalt (or equivalent asphaltic or bituminous compounds) to five, six, or seven parts of granulated slag, ground or unground. The slag and asphalt, or equivalent asphaltic or bituminous compound, may be combined alone, or may be used in conjunction with hydraulic cement or lime, either or both.

A further feature of my invention consists in facing the blocks or other articles produced in the following manner—that is to say, a block of the slag and cement may be faced with the composition of asphalt and slag, or a composition of cement, lime, and slag made under pressure. After the combined slag and cement come from the grinding-rollers, the composition or mixture is subjected to the action of beaters or mixers, and is then passed through sieves, (of a texture of, say, six to one hundred meshes to the square inch,) the large pieces thus screened being returned to the rolls to be crushed again. The use of lime is at all times optional.

The concrete thus obtained may be applied to the following purposes: To making bricks and tiles; to covering the sides and bottoms of water and oil tanks and reservoirs, cisterns, and aqueducts; to making and laying roadways, streets, sidewalks, and floors, and to forming foundations for the same. It may be also applied to forming foundations for houses, piers, abutments, bridges, sea-walls, and fences, and to covering posts, piles, and wooden structures of all kinds, in and out of water, to preserve them from decay, and from destruction by fire, or by worms or insects, and to covering iron, or iron and wood, employed in the construction of railroads and telegraph-posts. Further, it may be applied to making, lining, or coating water-pipes, when made of other material, and in the construction of fire-proof safes. Still further, it may be applied to various ornamental purposes, as the formation of cornices, sills, and moldings for various structures, and to the production of mantel-pieces, hearth-stones, door-steps, &c., in such structures; also, to the production of statuary and vessels of different kinds, such as flower-holders, vases, urns, &c.

I am well aware that slag, granulated and otherwise, has been used for the manufacture of artificial stone. I am also aware that the same has been pulverized and screened, as well as combined with cement and lime, by various processes. I therefore disclaim the employment of said slag, broadly, under the conditions just stated.

I claim—

1. The process of refining and preparing blast-furnace slag for use by successively granulating, screening, combining with cement or lime, pulverizing, and again screening, substantially as and for the purpose specified.

2. The process of preparing blast-furnace slag for use, by successively granulating, combining with cement or lime, and pulverizing, substantially as and for the purpose set forth.

In testimony that I claim the foregoing I have hereunto set my hand this 3d day of October, 1874.

W. HARROLD SMITH.

Witnesses:
M. DANL. CONNOLLY,
FRANK HARTMAN.